Oct. 21, 1958  W. E. TOLBERT  2,856,727
DISPOSABLE COASTER
Filed Jan. 16, 1957
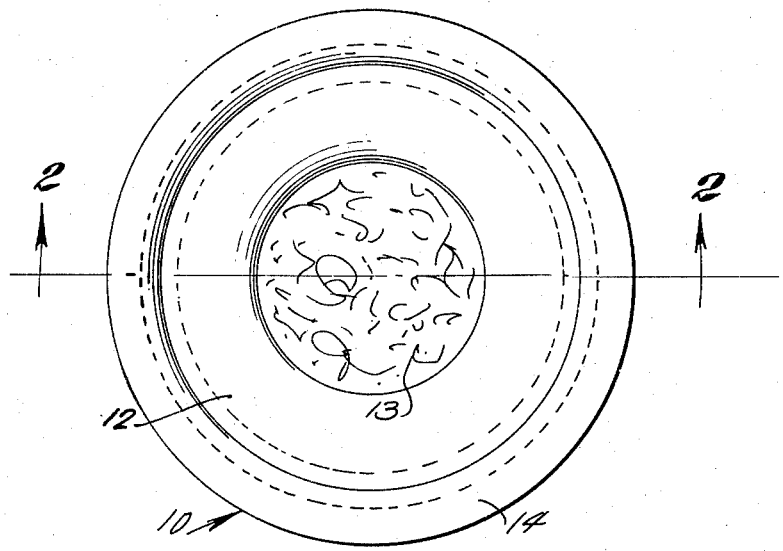
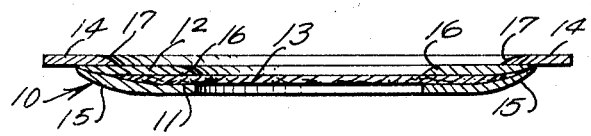
INVENTOR.
William E. Tolbert
BY Victor J. Evans & Co.
ATTORNEYS

United States Patent Office 2,856,727
Patented Oct. 21, 1958

2,856,727

DISPOSABLE COASTER

William E. Tolbert, Boise City, Okla.

Application January 16, 1957, Serial No. 634,441

5 Claims. (Cl. 45—68.4)

This invention relates to a coaster, and more particularly to a disposable coaster.

The object of the invention is to provide a disposable coaster which is adapted to be used with cups and saucers as when a person is drinking tea or coffee.

Another object of the invention is to provide a disposable coaster which is adapted to be positioned within a saucer so that any drippings of coffee, tea or the like will be readily absorbed by the coaster so that the liquid or drippings will not accidentally drop onto the person's clothing, and whereby the coaster can be readily discarded after it has been used.

A further object of the invention is to provide a disposable coaster which is extremely simple and inexpensive to manufacture.

Other object and advantages will be apparent during the course of the following description.

In the accompanying drawings, forming a part of this application, and in which like numerals are used to designate like parts throughout the same.

Figure 1 is a plan view of the disposable coaster, constructed according to the present invention.

Figure 2 is a sectional view taken on the line 2—2 of Figure 1.

Referring in detail to the drawings, the numeral 10 designates the disposable coaster of the present invention, and the coaster 10 includes a pair of rings or discs 11 and 12 which may be made of any suitable material. The outer peripheral portions of the rings 11 and 12 are secured together in any suitable manner, and interposed or positioned between the pair of rings 11 and 12 is a base 13 which is made of a porous material so that liquid such as coffee or tea will be readily absorbed thereby. The rings 11 and 12 are preferably made of a material which will not absorb liquid.

The coaster 10 further includes a body member 14 of circular shape which is arranged above the ring 12, and the body member 14 is of greater outside diameter than the pair of rings 11 and 12.

As shown in Figure 2, the outer peripheral portion of the lower rings 11 may be inclined or beveled as at 15 so as to insure that the coaster will fit snugly in the recessed portion of the saucer in which it is being used. The inner portion of the ring 12 may be beveled or inclined as at 16 and similarly the inner edge portion of the body member 14 may be beveled or inclined as at 17 whereby these inclined surfaces 17 and 16 will help to insure that any coffee or tea drippings will be guided onto the porous base 13 wherein they will be absorbed.

While the present invention has been described for use in connection with tea cups or coffee cups, it is to be understood that the inventive concept is not restricted to any particular fluid since the coaster can be used with containers of any type of fluid or liquid.

From the foregoing, it is apparent that there has been provided a disposable coaster which is especially suitable for use with cups and saucers so as to prevent drippings from accidentally falling onto a person's clothing. In use, the coaster 10 is adapted to be positioned in a saucer or beneath a cup wherein the cup may hold a beverage such as coffee or tea or the like. Then, in the event that any of the fluid drips or spills or overflows from the cup, this fluid will be absorbed by the base 13 so that as the cup is lifted up over the person's lap, the excess fluid will not drip onto the person's clothing and mess up the person's clothing. The base 13 is made of a suitable material which will absorb the liquid or fluid, while the rings 11 and 12 are made of a material which will not absorb fluid. The base 13 is positioned between the rings 11 and 12, and the outer portions of the rings 11 and 12 are secured together in any suitable manner, as for example, by means of an adhesive or by any other means. The circular body member 14 is of greater diameter than the rings 11 and 12, and the body member 14 is made of a material which will not absorb fluid, and the body member 14 may be provided with suitable advertisements or other indicia thereon.

The parts can be made of any suitable material and in any desired shape or size. For example, the rings 11 and 12 may be made of a suitable plastic such as cellophane, while the base 13 may be made of paper.

The rings 11 and 12 are provided with central registering openings or cutouts as shown in Figure 2 and similarly the body member 14 is provided with a central opening or cutout. The outside diameter of the rings 11 and 12 are slightly smaller than that of an ordinary tea cup, while the diameter of the openings in the rings are slightly larger than the recess at the center of an ordinary teacup.

The porous base 13 is made of a material which easily absorbs liquid such as tea or coffee, and the diameter of the base 13 is approximately three-fourths of an inch less than the outside diameter of the rings 11 and 12, but as previously stated the size of these parts can be varied as desired.

The disc or body member 14 is also provided with a central opening and the body member 14 is made of a material which does not absorb liquid and the body member 14 may be provided with printing or other drawings or coloring matter thereon. The outside diameter of the body member 14 may be equal to or greater than the outside diameter of the rings 11 and 12, while the diameter of the central opening in the body member 14 is less than the outside diameter of the rings 11 and 12.

The rings 11 and 12 may be secured together in any suitable manner, as for example by means of heat and/or an adhesive or glue, and the body member 14 may be secured to the upper ring 12 in any suitable manner.

When using the coaster, the device is placed in a saucer so that the bottom of a teacup or coffee cup placed in the saucer rests above the exposed portion of the base 13 so that the base will absorb liquids such as tea or coffee which may be spilled in the normal course of pouring or serving coffee or tea. This will serve to reduce or eliminate the liquid which has a tendency to cling to the bottom of the teacup so that this liquid will not drop or spill on the clothing of a person when the cup is lifted in the process of drinking. The rings 11 and 12 hold the parts in their proper assembled position when the base 13 becomes saturated and also facilitates the removal of the device from the saucer after it has been used. The body member 14 enhances the attractiveness of the device.

Thus, it will be seen that there has been provided a coaster which is primarily intended to be used with cups and saucers rather than with drinking glasses. The purpose of the coaster is to protect a person's clothing rather than furniture and the coaster is adapted to offer protection from the liquid being consumed rather than from condensed moisture on the outside of the container which holds the liquid being consumed. Furthermore, the coaster is of simple design and construction and is adapted to be made of inexpensive material so that it can be produced cheaply whereby the device can be readily disposed of after being used once so that the coaster is not used over and over again. The body member 14 can serve as a media for holding advertising in addition to its primary purpose as previously described. Furthermore, all of the various parts of the device may be provided with indicia or markings if desired. Furthermore, one or more of the parts may be omitted or left off if desired, as for example the body member 14 may be omitted. If desired the base 13 may be molded or pressed into a shape to conform to the shape of the depression at the bottom of the saucer or other containers on which the base 13 would normally rest when in use.

I claim:

1. In a disposable coaster for use with a cup and saucer, said coaster comprising first and second rings arranged adjacent each other and secured together at their outer peripheries, said rings being provided with central registering openings, a porous base of circular shape interposed between said pair of rings, and a circular body member mounted on said uppermost ring.

2. In a disposable coaster for use with a cup and saucer, said coaster comprising first and second rings arranged adjacent each other and secured together at their outer peripheries, said rings being provided with central registering openings, a porous base of circular shape interposed between said pair of rings, and a circular body member mounted on said uppermost ring, the outer peripheral portion of the lower ring being inclined upwardly, the inner peripheral portion of said body member and the inner peripheral portion of said upper ring being beveled downwardly, said body member being of greater outside diameter than said rings.

3. In a disposable coaster for use with a cup and saucer, said coaster comprising first and second rings arranged adjacent each other and secured together at their outer peripheries, said rings being provided with central registering openings, a porous base of circular shape interposed between said pair of rings, and a circular body member mounted on said uppermost ring, the outer peripheral portion of the lower ring being inclined upwardly, the inner peripheral portion of said body member and the inner peripheral portion of said upper ring being beveled downwardly, said body member being of greater outside diameter than said ring, said body member and rings being made of a material which does not absorb fluid.

4. A disposable coaster comprising first and second rings arranged adjacent each other and secured together at their outer peripheries, said rings being provided with central registering openings, a porous base interposed between said pair of rings, and a circular body member mounted on the uppermost ring.

5. In a disposable coaster for use with a cup and saucer, said coaster comprising first and second rings arranged adjacent each other and secured together at their outer peripheries, said rings being provided with central registering openings, and a porous base of circular shape interposed between said pair of rings, the outer peripheral portion of said first ring being inclined upwardly, and the inner peripheral portion of said second ring being bevelled downwardly.

References Cited in the file of this patent

UNITED STATES PATENTS

| 586,724 | Edmonds | July 20, 1897 |
| 2,257,264 | Le Fevre | Sept. 30, 1941 |